No. 895,452. PATENTED AUG. 11, 1908.
E. T. GREENFIELD.
TIRE.
APPLICATION FILED JAN. 24, 1906.
2 SHEETS—SHEET 1.
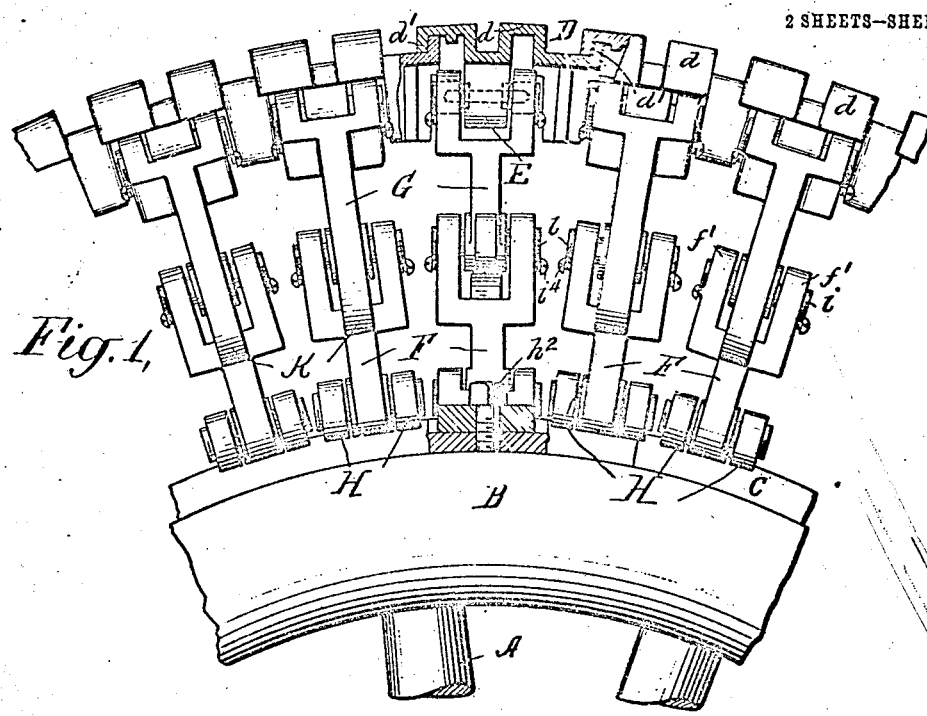
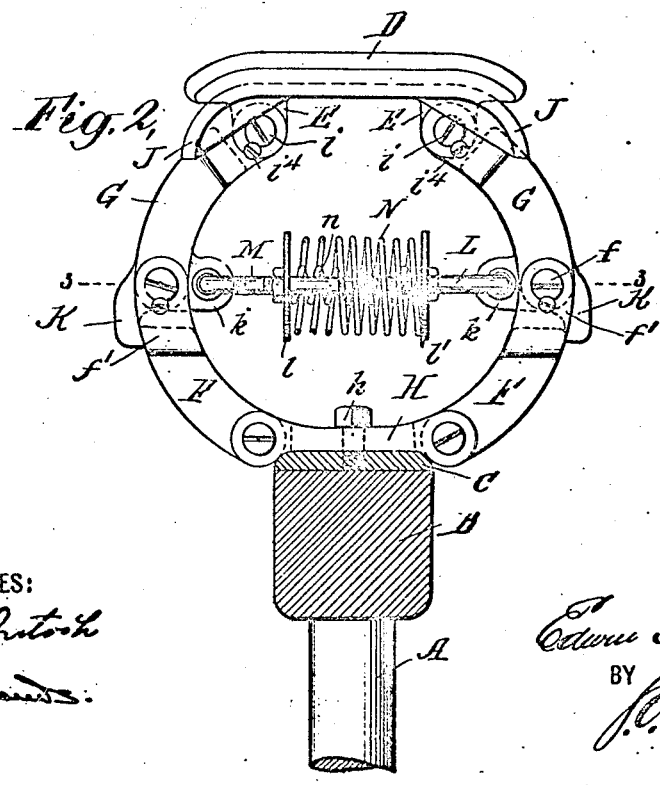
WITNESSES:
INVENTOR.
Edwin T. Greenfield
BY
ATTORNEY No. 895,452. PATENTED AUG. 11, 1908.
E. T. GREENFIELD.
TIRE.
APPLICATION FILED JAN. 24, 1906.
2 SHEETS—SHEET 2.
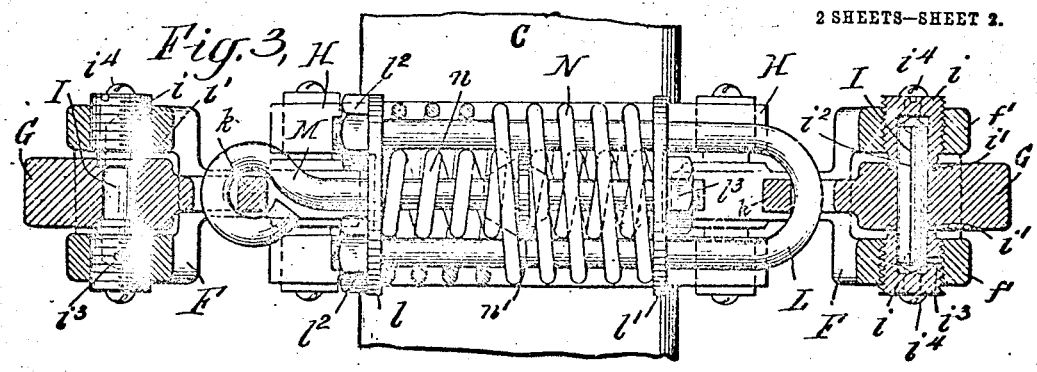
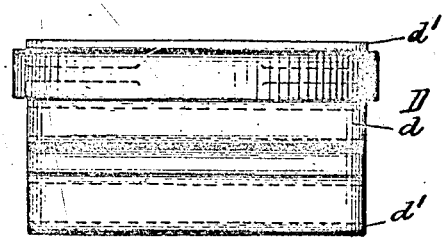
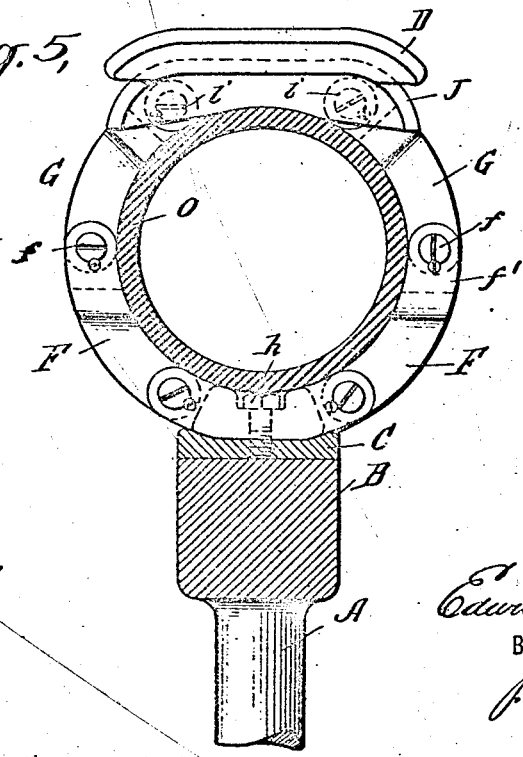
WITNESSES:
INVENTOR
Edwin T. Greenfield
BY
ATTORNEY

UNITED STATES PATENT OFFICE.

EDWIN T. GREENFIELD, OF KIAMESHA, NEW YORK.

TIRE.

No. 895,452.

Specification of Letters Patent.

Patented Aug. 11, 1908.

Application filed January 24, 1906. Serial No. 297,646.

*To all whom it may concern:*

Be it known that I, EDWIN T. GREENFIELD, a citizen of the United States, residing at Kiamesha, in the county of Sullivan and State of New York, have invented a certain new and useful Improvement in Tires, of which the following is a specification.

This invention relates to resilient tires for use on the wheels of vehicles, particularly heavy vehicles such as those having self-propelling mechanism.

The object of the invention is to provide a tire which, while possessing the requisite resiliency, is strong enough to withstand the rough usage to which it is necessarily subjected, and to this end the tire is so constructed that the resiliency is obtained without using an inflatable tube which is liable to be punctured, though I may, in accordance with my invention, employ such a tube and so protect it with an outer casing or shoe that the possibility of puncturing is practically eliminated.

Other auxiliary objects of the invention are to provide a tire having a tread composed of a plurality of metallic plates which preferably interlock each with the plates adjacent thereto, and devices for forcing these plates radially outward with a yielding pressure, the plates being preferably formed with transverse ridges which, by gripping the roadway, serve to prevent slipping and skidding. In accordance with my invention, I employ such a tread consisting of metallic plates and in combination therewith systems of toggle-levers for supporting and positioning the tread-plates; these toggle-levers are acted upon by devices for holding the tread-plates yieldingly in position, and for this purpose I may use springs tending to straighten the toggles, or, if desired, I may employ an inflatable tube.

I have illustrated the preferred embodiment of my invention, and also a modified form thereof, in the accompanying drawings, in which Figure 1 is a sectional elevation of a portion of the tire, Fig. 2 is a view of one of the tread-plates and its supporting devices, Fig. 3 is a sectional view on the line 3—3 of Fig. 2, Fig. 4 is a top view of one of the tread-plates, and Fig. 5 is a view similar to Fig. 2 but illustrating a modification.

Referring to these drawings, A indicates the spokes of the wheel, B the felly, and C the hoop or rim, preferably of metal which encircles the felly B. The tire consists of a shoe formed of a plurality of similar interlocking metallic plates D and toggles for yieldingly supporting these plates. The shape of plates D is best shown in Figs. 1 and 4, in which it will be seen that each of the plates is provided with one or more ridges $d$ which extend transversely of the tire when the plates are assembled and which by gripping the roadway prevent slipping and skidding. Also, each plate has at its sides outwardly and inwardly turned flanges $d'$, by which the plates are interlocked each with the plates adjacent thereto, as shown in Fig. 1.

Formed integral with each of the tread-plates D near the ends thereof are two inwardly extending projections E, each having an opening therethrough and by means of which the tread-plate is pivotelly connected to its two supporting toggles. Each of these toggles consists of links F and G, pivotally connected as indicated at $f$, the other end of link G being pivotally connected to the projection E on the tread-plate D and the other end of link F being pivotally connected to a supporting plate H secured by a bolt $h$ to the rim C. Each of these pivotal connections is preferably formed by bifurcating the end of one of the parts to be connected and inserting a pivot-pin through openings in the bifurcated arms and an opening through the end of the other link which lies between these arms. The preferred construction of this pivotal connection is illustrated in Fig. 3, in which the bifurcated arms $f'$, $f'$, of the link F, are shown as pivoted to the end of link G by a pin I, which extends through an opening in the end of link G and the ends of which are received in sockets formed in plugs $i$, $i$, which are threaded into openings in the arms $f'$, $f'$. The link G is countersunk about the ends of the opening for pin I to receive washers $i'$ against which the ends of plugs $i$, $i$, abut. In the side of pin I is a longitudinal groove, as indicated at $i^2$, and in one or both of the plugs $i$ is a radial opening $i^3$, adapted to communicate with the groove $i^2$ in pin I, so that by loosening the plug $i$ the opening $i^3$ may be filled with lubricating oil, which when the plug is returned to its normal position will flow slowly out into and along the groove $i^2$ in pin I. In order to hold the plugs $i$ in position and prevent the jarring of the vehicle from causing them to work loose, I provide set-screws $i^4$ entering openings adjacent to the openings for the plugs $i$ and the heads of which overlie the ends of the plugs.

Each of the tread-plates D preferably has a guard J formed integral therewith, which extends over the pivotal connection of the link G to the projection E and prevents the entrance of dirt into this connection. Each link G has formed integral therewith a stop K adapted to engage the side of link F and arrest the straightening movement of the toggle when the plate D carried thereby has been pressed outwardly to its normal position. Each link G has also an inwardly extending projection $k$ having an opening therethrough for connection of the devices which serve to straighten the toggles.

Referring now to Fig. 3, I will describe the arrangement of the springs which act to straighten the toggles, that is, move them toward the position in which the two links of the toggle are in alinement to restore the parts to the positions shown in Fig. 2, and thus force the tread-plates D outwardly with a yielding pressure. A yoke L extends through the opening in the projection $k$ on link G, and the arms of this yoke extend through openings in two cross-heads $l$, $l'$. The ends of these arms are threaded to receive nuts $l^2$ by which the cross-head $l$ is positioned upon the arms of the yoke. A pin M has an eye at one end, by which the pin is secured to the projection $k$ opposite that to which the yoke L is connected, and this pin extends through openings in the cross-heads $l$ and $l'$, its end being threaded to receive a nut $l^3$, by which cross-head $l'$ is positioned upon the pin. Coiled about the arms of yoke L is a spring N, the ends of which engage the cross-heads $l$, $l'$. Coiled about the pin M, within the arms of yoke L, is a second spring $n$, the ends of which also bear upon the cross-heads $l$, $l'$. Preferably, a washer $n'$ is secured upon pin M about midway between the cross-heads $l$, $l'$, to hold spring $n$ in position.

A pair of toggle-levers and springs therefor constructed in the manner above described are preferably provided for each of the tread-plates D, as illustrated in Fig. 1, and it will be seen that when any tread-plate strikes a projection in the roadway the two toggles supporting the plate, each composed of the links F and G, will buckle against the tension of springs N and $n$ to permit the tread-plate to be pressed radially inward and thus avoid jarring the vehicle body, and as soon as the obstruction is passed the plate will be pressed outwardly to its normal position again. The outward movement of each plate is limited by the coaction of the projections K with the links F.

In Fig. 5, I have illustrated a slightly modified form of tire, in which instead of the springs N and $n$ for straightening the two toggles which support each of the tread-plates, I employ an inflatable tube O, the heads of bolts $h$ being countersunk and the projections $k$ omitted, so that a casing having a smooth interior is provided for the tube. It will readily be seen that when the tube is inflated it will serve to yieldingly hold the toggles and the tread-plates in their normal positions.

In both of the tires illustrated and described herein, the outer shoe or casing consisting of interlocking metallic plates together with the guards J integral with the plates, forms an ample protection for the other parts of the tire against injury thereto by obstructions in the roadway. As the plates D are comparatively narrow and movable each relatively to the plates adjacent thereto, the shoe possesses quite as much flexibility as is necessary. By varying the positions of the nuts $l^2$ and $l^3$, the tension of springs N and $n$ can be changed to adjust the resiliency of the tire and in the form of my invention shown in Fig. 5, the pressure within the tube can be regulated for the same purpose. In both of the forms, any obstruction in the roadway will buckle the toggles supporting the plates engaged thereby and as soon as the obstruction is passed the toggles will be straightened by the springs or by the inflated tube until further relative movement of the links of the toggles is prevented by the projections K.

Having now described my invention, what I claim as new therein and desire to secure by Letters Patent is as follows:—

1. In a tire, a shoe comprising a plurality of interlocked metallic plates, a pair of toggles supporting each plate, the toggles of each pair lying in a plane transverse to the general plane of the tire, and means for straightening the toggles, substantially as set forth.

2. In a tire, a shoe comprising a plurality of interlocked metallic plates, a pair of toggles supporting each plate, the toggles of each pair lying in a plane transverse to the general plane of the tire, and a spring connecting the toggles of a pair and acting thereon to straighten them, substantially as set forth.

3. In a tire, a shoe comprising a plurality of interlocked metallic plates, a pair of toggles supporting each plate, means for acting on said toggles to straighten the same, and adjusting devices for varying the power of said straightening means, substantially as set forth.

4. In a tire, a hoop, a plurality of supports thereon, a plurality of metallic plates, a toggle connecting each end of each of said plates to one end of one of said supports, the toggles connected to each plate lying in a plane transverse to the general plane of the tire, and means for straightening said toggles, substantially as set forth.

5. In a tire, a shoe comprising a plurality of interlocked metallic plates, a pair of toggles supporting each plate, the toggles of each pair lying in a plane transverse to the general plane of the tire, and a spring connecting the toggles of each pair and acting thereon to straighten them, each of said springs being disposed substantially transverse to a radius of the tire passing through it, substantially as set forth.

6. In a tire, a shoe comprising a plurality of interlocked metallic plates, a pair of toggles yieldingly supporting each plate, guards for protecting said toggles, and means for straightening the toggles, substantially as set forth.

7. In a tire, a shoe comprising a plurality of interlocked metallic plates, a plurality of toggles lying side by side and yieldingly supporting said plates and means for straightening the toggles, substantially as set forth.

8. In a tire, a shoe comprising a plurality of metallic plates, a pair of toggles yieldingly supporting each of said plates, guards on said plates overlying the ends of said toggles and means for straightening the toggles, substantially as described.

9. In a tire, a shoe comprising a plurality of interlocking metallic plates, a pair of toggles yieldingly supporting each of said plates, means acting on the toggles for straightening the same, and means for limiting the straightening movement of the toggles, substantially as described.

10. In a tire, a shoe comprising a plurality of metallic plates, a pair of toggles supporting each of said plates, springs each acting on the toggles of a pair to straighten the same, and means for adjusting the tension of the springs, substantially as described.

11. In a tire, a shoe comprising a plurality of metallic plates and means for supporting each of said plates comprising a pair of toggles, a spring between said toggles, cross-heads between which said spring is compressed and means connecting each of said cross-heads to one of said toggles, substantially as described.

12. In a tire, a shoe comprising a plurality of metallic plates and means for supporting each of said plates comprising a pair of toggles, a spring between said toggles, cross-heads between which said spring is compressed, a connection between each of said cross-heads and one of said toggles and means for adjusting the cross-head relatively to said connection, substantially as described.

This specification signed and witnessed this 22nd day of January, 1906.

EDWIN T. GREENFIELD.

Witnesses:
S. O. EDMONDS,
D. S. EDMONDS.